United States Patent
Burckhardt

(10) Patent No.: US 9,290,608 B2
(45) Date of Patent: *Mar. 22, 2016

(54) ASYMMETRIC DIALDIMINE-CONTAINING POLYURETHANE COMPOSITION

(71) Applicant: SIKA TECHNOLOGY AG, Zurich (CH)

(72) Inventor: Urs Burckhardt, Zurich (CH)

(73) Assignee: SIKA TECHNOLOGY AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,206

(22) Filed: Jul. 14, 2014

(65) Prior Publication Data

US 2014/0322531 A1    Oct. 30, 2014

Related U.S. Application Data

(62) Division of application No. 12/450,180, filed as application No. PCT/EP2008/053635 on Mar. 27, 2008, now Pat. No. 8,816,037.

(30) Foreign Application Priority Data

Mar. 27, 2007 (EP) .................................... 07105006

(51) Int. Cl.

| C08G 18/00 | (2006.01) |
|---|---|
| C08G 18/83 | (2006.01) |
| C08G 18/78 | (2006.01) |
| C08G 18/32 | (2006.01) |
| C08G 18/12 | (2006.01) |
| C08G 18/48 | (2006.01) |
| C08G 18/76 | (2006.01) |
| C09D 175/04 | (2006.01) |
| C09J 5/00 | (2006.01) |
| C09J 5/02 | (2006.01) |
| C09J 175/04 | (2006.01) |
| C09K 3/10 | (2006.01) |

(52) U.S. Cl.
CPC .............. *C08G 18/833* (2013.01); *C08G 18/12* (2013.01); *C08G 18/3253* (2013.01); *C08G 18/3256* (2013.01); *C08G 18/4812* (2013.01); *C08G 18/7621* (2013.01); *C08G 18/7671* (2013.01); *C08G 18/7862* (2013.01); *C09D 175/04* (2013.01); *C09J 5/00* (2013.01); *C09J 5/02* (2013.01); *C09J 175/04* (2013.01); *C09K 3/1021* (2013.01); *Y10T 428/2896* (2015.01); *Y10T 428/31551* (2015.04)

(58) Field of Classification Search
CPC ........... C08G 18/7862; C08G 18/3253; C08G 18/3256

See application file for complete search history.

(56) References Cited

U.S. PATENT DOCUMENTS

| 3,567,692 A | 3/1971 | Haggis et al. |
|---|---|---|
| 4,469,831 A | 9/1984 | Bueltjer et al. |
| 4,853,454 A | 8/1989 | Merger et al. |
| 5,087,661 A | 2/1992 | Aoki et al. |
| 5,726,272 A | 3/1998 | Yonek |
| 5,894,071 A | 4/1999 | Merz et al. |
| 6,136,942 A | 10/2000 | Pfenninger et al. |
| 2006/0052522 A1 | 3/2006 | Burckhardt et al. |
| 2006/0149025 A1 | 7/2006 | Burckhardt |
| 2008/0251204 A1 | 10/2008 | Burckhardt et al. |
| 2009/0099333 A1 | 4/2009 | Burckhardt |
| 2009/0159204 A1 | 6/2009 | Burckhardt |
| 2009/0176944 A1 | 7/2009 | Burckhardt |
| 2010/0015450 A1 | 1/2010 | Burkhardt |
| 2012/0142870 A1 | 6/2012 | Burckhardt |

FOREIGN PATENT DOCUMENTS

| CA | 1 205 249 | 5/1986 |
|---|---|---|
| DE | 31 33 769 A1 | 3/1983 |
| EP | 0 947 529 B1 | 10/1999 |
| EP | 1 770 107 A1 | 4/2007 |
| EP | 1 772 447 A1 | 4/2007 |
| EP | 1 775 284 A1 | 4/2007 |
| WO | WO 03/006521 A1 | 1/2003 |
| WO | WO 2004/013200 A1 | 2/2004 |

OTHER PUBLICATIONS

Henecka, *Methods of Organic Chemistry*, "Carboxylic acid esters," 1952, pp. 516-529 w/ translation.
Jun. 13, 2011 Office Action issued in U.S Appl. No. 12/450,181.
Feb. 8, 2012 Office Action issued in U.S. Appl. No. 12/450,181.
Jun. 27, 2012 Office Action issued in U.S. Appl. No. 13/370,926.

*Primary Examiner* — Michael L Leonard

(74) *Attorney, Agent, or Firm* — Oliff PLC

(57) ABSTRACT

The invention relates to moisture-curing compositions which comprise at least one aromatic isocyanate group-bearing polyisocyanate and at least one dialdimine of formula (I). The compositions according to the invention have a longer open time and at the same time a shorter curing time, they are storage-stable and cure without forming bubbles. They are especially suitable as adhesives, sealing agents, potting compounds or coating materials, the use as sealing agents being especially advantageous.

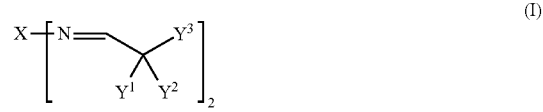

(I)

26 Claims, No Drawings

ASYMMETRIC DIALDIMINE-CONTAINING POLYURETHANE COMPOSITION

This is a Division of application Ser. No. 12/450,180 filed Sep. 15, 2009, which in turn is National Stage Application of PCT/EP2008/053635, filed on Mar. 27, 2008, which claims the benefit of European Patent Application No. 07105006.6 filed Mar. 27, 2007. The disclosure of the prior applications is hereby incorporated by reference herein in its entirety.

TECHNICAL FIELD

The present invention relates to the field of moisture-curing polyurethane compositions, and to the use thereof, especially as elastic adhesives, sealants and coatings.

STATE OF THE ART

Moisture-curing compositions based on polyurethane polymers having isocyanate groups have been used for some time as elastic adhesives, sealants and coatings. The polyurethane polymers used therein are typically formed from polyetherpolyols and polyisocyanates. When they are cured by means of moisture, these compositions tend to form bubbles as a result of carbon dioxide gas released, which is not dissolved or led off rapidly enough.

In order to prevent bubble formation, capped amines, so-called "latent hardeners", for example polyoxazolidines, polyketimines or polyaldimines, can be added to the polyurethane compositions. This can, however, lower the storage stability of the compositions.

U.S. Pat. No. 4,469,831 and U.S. Pat. No. 4,853,454 disclose polyurethane compositions which comprise polyaldimines and which possess a good storage stability.

WO 2004/013200 discloses polyurethane compositions comprising specific polyaldimines, which likewise have a good storage stability and which cure without odor.

Polyurethane compositions comprising latent hardeners, especially those based on aromatic polyisocyanates, however, usually have the disadvantage that their curing sets in very rapidly, so as to give rise to too short an open time and hence too short a processing window. Moreover, in the course of curing, usually volatile and odorous elimination products, especially aldehydes or ketones, are released, which is troublesome or completely undesired according to the application.

SUMMARY OF THE INVENTION

It is therefore an object of the present invention to provide moisture-curing polyurethane compositions which are storage-stable, have a long open time and a high curing rate, and cure without bubble formation.

It has now been found that, surprisingly, compositions as claimed in claim 1 solve this problem. These compositions comprise specific asymmetric dialdimines, as a result of which they are simultaneously storage-stable, have a long open time and a high curing rate, and cure without bubbles. In a preferred embodiment, these compositions are additionally odorless, before, during and after their curing. The compositions may have a one-component or two-component configuration, and be used as an adhesive, sealant, potting composition or coating. A particularly advantageous use has been found to be that as a sealant.

The invention further provides a process for adhesive bonding as described herein, a process for sealing as described herein and a process for coating as described herein.

Finally, the cured composition as described herein and the articles adhesive bonded, sealed or coated by the processes described as described herein form part of the subject matter of the present invention.

Preferred embodiments of the invention are also described herein.

Ways of Performing the Invention

The present invention provides a composition comprising
a) at least one polyisocyanate P having aromatic isocyanate groups, and
b) at least one dialdimine A of the formula (I).

In this structure, X is the radical of a diamine DA with two primary amino groups after the removal of these two amine groups. In addition, $Y^1$ and $Y^2$ are either each independently a monovalent hydrocarbon radical having 1 to 12 carbon atoms, or $Y^1$ and $Y^2$ together are a divalent hydrocarbon radical which has 4 to 20 carbon atoms and is part of an optionally substituted carbocyclic ring having 5 to 8, preferably 6, carbon atoms.

In addition, $Y^3$ is a monovalent hydrocarbon radical which optionally has at least one heteroatom, especially oxygen in the form of ether, carbonyl or ester groups.

An essential proviso for the invention is that at least one of the two primary amino groups of the diamine DA is an aliphatic amino group, and that the two primary amino groups of the diamine DA differ from one another either
in the number of hydrogen atoms on the carbon atoms ($C_\alpha$) in the α position to the particular amino group by at least one
or
in the number of hydrogen atoms on the carbon atoms ($C_\beta$) in the β position to the particular amino group by at least two.

In the present document, the term "polymer" firstly embraces a collective of macromolecules which are chemically homogeneous but different in relation to degree of polymerization, molar mass and chain length, which has been prepared by a poly reaction (polymerization, polyaddition, polycondensation). The term secondly also embraces derivatives of such a collective of macromolecules from poly reactions, i.e. compounds which have been obtained by reactions, for example additions or substitutions, of functional groups on given macromolecules, and which may be chemically homogeneous or chemically inhomogeneous. The term further also comprises what are known as prepolymers, i.e. reactive oligomeric preliminary adducts whose functional groups are involved in the formation of macromolecules.

The term "polyurethane polymer" embraces all polymers prepared by what is known as the diisocyanate polyaddition process. This also includes those polymers which are virtually or entirely free of urethane groups. Examples of polyurethane polymers are polyetherpolyurethanes, polyesterpolyurethanes, polyetherpolyureas, polyureas, polyesterpolyureas, polyisocyanurates and polycarbodiimides.

In the present document, substance names beginning with "poly", such as polyaldimine, polyisocyanate, polyol or polyamine, denote substances which, in a formal sense, contain two or more of the functional groups which occur in their name per molecule.

In the present document, the term "aromatic isocyanate group" refers to an isocyanate group which is bonded to an aromatic carbon atom.

In the present document, the term "primary amino group" refers to an $NH_2$ group which is bonded to an organic radical, whereas the term "secondary amino group" refers to an NH group which is bonded to two organic radicals which may also together be part of a ring.

"Aliphatic amino group" refers to an amino group which is bonded to an aliphatic, cycloaliphatic or arylaliphatic radical. It thus differs from an "aromatic amino group", which is bonded directly to an aromatic or heteroaromatic radical, as, for example, in aniline or 2-aminopyridine.

In this document, "open time" refers to the time during which the composition can be processed once the isocyanate groups of the polyisocyanate have come into contact with water.

The composition comprises at least one polyisocyanate P having aromatic isocyanate groups.

In a first embodiment, the polyisocyanate P having aromatic isocyanate groups is a polyurethane polymer PUP having aromatic isocyanate groups.

A suitable polyurethane polymer PUP is especially obtainable from the reaction of at least one polyol with at least one aromatic polyisocyanate. This reaction can be effected by reacting the polyol and the polyisocyanate by customary methods, for example at temperatures of 50° C. to 100° C., optionally with additional use of suitable catalysts, the polyisocyanate being metered in such a way that its isocyanate groups are present in a stoichiometric excess in relation to the hydroxyl groups of the polyol. The polyisocyanate is advantageously metered in so as to observe an NCO/OH ratio of 1.3 to 5, especially one of 1.5 to 3. The NCO/OH ratio is understood here to mean the ratio of the number of the isocyanate groups used to the number of the hydroxyl groups used. Preferably, in the polyurethane polymer PUP after the reaction of all hydroxyl groups of the polyol, there preferably remains a content of free isocyanate groups of 0.5 to 15% by weight, more preferably of 0.5 to 10% by weight.

Optionally, the polyurethane polymer PUP can be prepared with additional use of plasticizers, in which case the plasticizers used do not contain any groups reactive toward isocyanates.

The polyols used for the preparation of a polyurethane polymer PUP may, for example, be the following commercial polyols or mixtures thereof.

Polyoxyalkylenepolyols, also known as polyetherpolyols or oligoetherols, which are polymerization products of ethylene oxide, 1,2-propylene oxide, 1,2- or 2,3-butylene oxide, oxetane, tetrahydrofuran or mixtures thereof, possibly polymerized with the aid of a starter molecule with two or more active hydrogen atoms, for example water, ammonia or compounds having a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforementioned compounds. It is possible to use either polyoxyalkylenepolyols which have a low degree of unsaturation (measured to ASTM D-2849-69 and reported in milliequivalents of unsaturation per gram of polyol (meq/g)), prepared, for example, with the aid of double metal cyanide complex catalysts (DMC catalysts), or polyoxyalkylenepolyols with a higher degree of unsaturation, prepared, for example, with the aid of anionic catalysts such as NaOH, KOH, CsOH or alkali metal alkoxides.

Particularly suitable are polyoxyalkylenediols and -triols, especially polyoxypropylenediols and polyoxypropylenetriols.

Especially suitable are polyoxypropylenediols and -triols having a degree of unsaturation lower than 0.02 meq/g and a molecular weight in the range of 1000-30 000 g/mol, and also polyoxypropylenediols and -triols with a molecular weight of 400-8000 g/mol.

Likewise particularly suitable are so-called ethylene oxide-terminated ("EO-endcapped", ethylene oxide-endcapped) polyoxypropylenepolyols. The latter are specific polyoxypropylenepolyoxyethylenepolyols which are obtained, for example, by further alkoxylating pure polyoxypropylenepolyols, especially polyoxypropylenediols and -triols, with ethylene oxide on completion of the polypropoxylation reaction, and have primary hydroxyl groups as a result, Styrene-acrylonitrile- or acrylonitrile-methyl methacrylate-grafted polyetherpolyols.

Polyesterpolyols, also known as oligoesterols, prepared, for example, from di- to trihydric alcohols, for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, for example succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid, or mixtures of the aforementioned acids, and also polyesterpolyols formed from lactones, for example from ε-caprolactone.

Polycarbonatepolyols, as obtainable by reaction, for example, of the abovementioned alcohols—used to form the polyesterpolyols—with dialkyl carbonates, diaryl carbonates or phosgene.

Polyacrylate- and polymethacrylatepolyols.

Poly-hydroxy-functional fats and oils, for example natural fats and oils, especially castor oil; or polyols—known as oleochemical polyols—obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can be derivatized, for example, by hydroformylation and hydrogenation to hydroxy fatty acid esters.

Polyhydrocarbonpolyols, also known as oligohydrocarbonols, for example poly-hydroxy-functional ethylene-propylene, ethylene-butylene or ethylene-propylene-diene copolymers, as produced, for example, by Kraton Polymers, or poly-hydroxy-functional copolymers of dienes such as 1,3-butadiene or diene mixtures, and vinyl monomers such as styrene, acrylonitrile or isobutylene, or poly-hydroxy-functional polybutadienepolyols, for example those which are prepared by copolymerization of 1,3-butadiene and allyl alcohol and may also be hydrogenated.

poly-hydroxy-functional acrylonitrile/butadiene copolymers, as can be prepared, for example, from epoxides or amino alcohols and carboxyl-terminated acrylonitrile/butadiene copolymers (commercially available under the Hycar® CTBN name from Hanse Chemie).

These polyols mentioned preferably have a mean molecular weight of 250-30 000 g/mol, especially of 400-20 000 g/mol, and preferably have a mean OH functionality in the range from 1.6 to 3.

In addition to these polyols mentioned, small amounts of low molecular weight di- or polyhydric alcohols, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the aforementioned di- and polyhydric alcohols, and mixtures of the aforementioned alcohols, can be used additionally in the preparation of the polyurethane polymer PUP. It is likewise possible to use small amounts of polyols with a mean OH functionality of more than 3, for example sugar polyols.

The polyisocyanates used for the preparation of a polyurethane polymer PUP having aromatic isocyanate groups are aromatic polyisocyanates, especially the diisocyanates. Suitable aromatic polyisocyanates are, for example, 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-d iisocyanatodiphenyl (TODI), dianisidine diisocyanate (DADI), oligomers and polymers of the aforementioned isocyanates, and any desired mixtures of the aforementioned isocyanates. Preference is given to MDI and TDI.

The aromatic polyisocyanates mentioned are commercially available.

In a second embodiment, the polyisocyanate P having aromatic isocyanate groups is an aromatic polyisocyanate PI. The aromatic polyisocyanate PI is especially an aromatic diisocyanate, or a low molecular weight oligomer of an aromatic diisocyanate, or a derivative of an aromatic diisocyanate, or any desired mixture of these isocyanates. Suitable aromatic polyisocyanates PI are, for example, 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), oligomers and polymers of the aforementioned isocyanates, and any desired mixtures of the aforementioned isocyanates.

Preferred polyisocyanates PI are room temperature liquid forms of MDI (so-called "modified MDI"), which are mixtures of MDI with MDI derivatives, for example MDI carbodiimides, MDI uretonimines or MDI urethanes, known, for example, under trade names such as Desmodur® CD, Desmodur® PF, Desmodur® PC (all from Bayer), Lupranat® MM 103 (from BASF), Isonate® M 143 (from Dow), Suprasec® 2020, Suprasec® 2388 (both from Huntsman); technical grade forms of PMDI, for example obtainable under trade names such as Desmodur® VL, VL 50, VL R 10, VL R 20 and Desmodur® VKS 20 F (all from Bayer), Lupranat® M 10 R, Lupranat® M 20 R (both from BASF), Isonate® M 309, Voranate® M 229, Voranate M® 580 (all from Dow), Suprasec® 5025, Suprasec® 2050, Suprasec® 2487 (all from Huntsman); and technical grade forms of oligomeric TDI, for example Desmodur® IL (Bayer). The aforementioned polyisocyanates are typically mixtures of substances with different degrees of oligomerization and/or chemical structures. They preferably have a mean NCO functionality of 2.1 to 4.0 and contain especially isocyanurate, iminooxadiazinedione, uretdione, urethane, biuret, allophanate, carbodiimide, uretonimine or oxadiazinetrione groups.

In a third embodiment, the polyisocyanate P is a mixture consisting of at least one polyurethane polymer PUP and at least one polyisocyanate PI, as have been described above.

Typically, the polyisocyanate P is present in an amount of 5 to 95% by weight, preferably in an amount of 10 to 90% by weight, based on the overall composition. In filled compositions, i.e. compositions which comprise a filler, the polyisocyanate P is preferably present in an amount of 5 to 60% by weight, especially 10 to 50% by weight, based on the overall composition.

The composition comprises, in addition to at least one polyisocyanate P having aromatic isocyanate groups, at least one dialdimine A of the formula (I).

Preferably, $Y^1$ and $Y^2$ are each a methyl group.
Preferably, $Y^3$ is a radical of the formula (II) or (III)

where $R^3$ is a hydrogen atom or an alkyl or arylalkyl group, especially having 1 to 12 carbon atoms, preferably a hydrogen atom;

$R^4$ is a hydrocarbon radical having 1 to 30, especially 11 to 30, carbon atoms, which optionally contains heteroatoms; and $R^5$ is a hydrogen atom or is a linear or branched alkyl radical having 1 to 30, especially 11 to 30, carbon atoms, optionally with cyclic components and optionally with at least one heteroatom, or is a mono- or polyunsaturated, linear or branched hydrocarbon radical having 5 to 30 carbon atoms, or is an optionally substituted aromatic or heteroaromatic 5- or 6-membered ring.

More preferably, $Y^3$ is a radical of the formula (III).

The broken lines in the formulae in this document each represent the bond between a substituent and the corresponding molecular radical.

A dialdimine A of the formula (I) is obtainable by a condensation reaction with elimination of water between at least one diamine DA of the formula (IV) and at least one aldehyde ALD of the formula (V). The aldehyde ALD of the formula (V) is used here stoichiometrically or in a stoichiometric excess in relation to the amino groups of the diamine.

$$X-\!\!-\!\![NH_2]_2 \quad (IV)$$

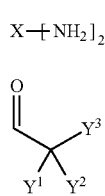

(V)

In the formulae (IV) and (V), X, $Y^1$, $Y^2$ and $Y^3$ each have the definitions already mentioned.

It is essential for the present invention that the two primary amino groups of the diamine DA differ from one another either in the number of the hydrogen atoms on the carbon atoms ($C_\alpha$) in the α position (=1 position) to the particular amino groups by at least one, or in the number of hydrogen atoms on the carbon atoms ($C_\beta$) in the β position (=2 position) to the particular amino groups by at least two.

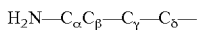

The diamine DA thus has different substitution patterns on the α carbon atoms and on the β carbon atoms to the particular amino group. Diamines having such different substitution are also referred to in the present document as "asymmetric". This different substitution leads to a different reactivity of the two primary amino groups, especially toward isocyanate groups.

The diamine DA thus differs, in one embodiment, in the substitution pattern on the carbon atoms which are in the a position to the primary amino groups.

Such diamines DA are, for example, 1,2-propanediamine, 2-methyl-1,2-propanediamine, 1,3-butanediamine, 1,3-diaminopentane (DAMP), 4-aminoethylaniline, 4-aminomethylaniline, 4-[(4-aminocyclohexyl)methyl]aniline, 2-aminoethylaniline, 2-aminomethylaniline, 2-[(4-aminocyclohexyl)methyl]aniline and 4-[(2-aminocyclohexyl)methyl]aniline.

In another embodiment, the diamine DA thus differs in the substitution pattern at the carbon atoms which are in the β position to the primary amino groups.

Such diamines DA are, for example, 2,2,4-trimethylhexamethylenediamine (TMD), 1,5-diamino-2-butyl-2-ethylpentane, 1-amino-3-aminomethyl-3,5,5-trimethylcyclohexane (=isophoronediamine=IPDA) and 1,4-diamino-2,2,6-trimethylcyclohexane (TMCDA).

The diamine DA has two primary amino groups, of which at least one is aliphatic. The second amino group may be an aliphatic or aromatic amino group.

Diamines DA of the formula (IV) are not considered to include diamines whose amino groups differ from one another only by one hydrogen atom on the carbon atoms ($C_\beta$) in the β position to the particular amino groups. One example of such a diamine which is not a diamine DA is 2-methylpentamethylenediamine (=1,5-diamino-2-methylpentane=MPMD). Diamines DA of the formula (IV) are likewise considered not to include diamines whose amino groups differ from one another merely in the number of the hydrogen atoms on the carbon atoms ($C_\gamma$ and $C_\delta$) in the γ or δ position to the particular amino groups. In all these cases, the different substitution pattern on the diamine brings about an only insignificant difference, if any, in the reactivity of the amino groups, especially toward isocyanate groups.

The diamine DA of the formula (IV) is preferably selected from the group consisting of 1,3-diaminopentane (DAMP), 1,5-diamino-2-butyl-2-ethylpentane, 2,2,4-trimethylhexamethylenediamine (TMD) and 1-amino-3-aminomethyl-3,5,5-trimethylcyclohexane (=isophoronediamine=IPDA).

The aldehyde ALD which can be used to prepare a dialdimine A of the formula (I) has the formula (V) and is a tertiary aliphatic or tertiary cycloaliphatic aldehyde. Suitable aldehydes ALD are, for example, pivalaldehyde (=2,2-dimethylpropanal), 2,2-dimethylbutanal, 2,2-diethylbutanal, 1-methylcyclopentanecarboxaldehyde, 1-methylcyclohexanecarboxaldehyde; ethers formed from 2-hydroxy-2-methylpropanal and alcohols such as propanol, isopropanol, butanol and 2-ethylhexanol; esters formed from 2-formyl-2-methylpropionoic acid or 3-formyl-3-methylbutyric acid and alcohols such as propanol, isopropanol, butanol and 2-ethylhexanol; esters formed from 2-hydroxy-2-methylpropanal and carboxylic acids such as butyric acid, isobutyric acid and 2-ethylhexanoic acid; and the ethers and esters, described as particularly suitable hereinafter, of 2,2-disubstituted 3-hydroxypropanals, -butanals or analogous higher aldehydes, especially of 2,2-dimethyl-3-hydroxypropanal.

In one embodiment, particularly suitable aldehydes ALD of the formula (V) are aldehydes ALD1 of the formula (VI), i.e. aldehydes ALD of the formula (V) with the $Y^3$ radical of the formula (II).

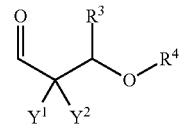

(VI)

In formula (VI), $Y^1$ and $Y^2$ are preferably each a methyl group and $R^3$ is preferably a hydrogen atom.

The aldehydes ALD1 of the formula (VI) are ethers of aliphatic, arylaliphatic or cycloaliphatic 2,2-disubstituted 3-hydroxyaldehydes with alcohols or phenols of the formula $R^4$—OH, for example fatty alcohols or phenol. Suitable 2,2-disubstituted 3-hydroxyaldehydes are in turn obtainable from aldol reactions, especially crossed aldol reactions, between primary or secondary aliphatic aldehydes, especially formaldehyde, and secondary aliphatic, secondary arylaliphatic or secondary cycloaliphatic aldehydes, for example isobutyraldehyde, 2-methylbutyraldehyde, 2-ethylbutyraldehyde, 2-methyl-valerald ehyde, 2-ethylcapronaldehyde, cyclopentanecarboxaldehyde, cyclo-hexanecarboxaldehyde, 1,2,3,6-tetrahydrobenzaldehyde, 2-methyl-3-phenylpropionaldehyde, 2-phenylpropionaldehyde (hydratropaldehyde) or diphenyl-acetaldehyde. Examples of suitable 2,2-disubstituted 3-hydroxyaldehydes are 2,2-dimethyl-3-hydroxypropanal, 2-hydroxymethyl-2-methylbutanal, 2-hydroxymethyl-2-ethylbutanal, 2-hydroxymethyl-2-methylpentanal, 2-hydroxymethyl-2-ethylhexanal, 1-hydroxymethylcyclopentanecarboxaldehyde, 1-hydroxy-methylcyclohexanecarboxaldehyde 1-hydroxymethylcyclohex-3-enecarbox-aldehyde, 2-hydroxymethyl-2-methyl-3-phenylpropanal, 3-hydroxy-2-methyl-2-phenylpropanal and 3-hydroxy-2,2-diphenylpropanal.

Examples of such aldehydes ALD1 of the formula (VI) which should be mentioned are 2,2-dimethyl-3-(2-ethylhexyloxy)propanal, 2,2-dimethyl-3-lauroxypropanal, 2,2-dimethyl-3-stearoxypropanal, 3-cyclohexyloxy-2,2-dimethylpropanal and 2,2-dimethyl-3-phenoxypropanal.

In a further embodiment, particularly suitable aldehydes ALD of the formula (V) are aldehydes ALD2 of the formula (VII), i.e. aldehydes ALD of the formula (V) with the $Y^3$ radical of the formula (III).

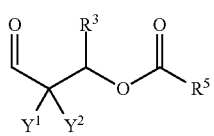

(VII)

In formula (VII), $Y^1$ and $Y^2$ are preferably each a methyl group, and $R^3$ is preferably a hydrogen atom.

The aldehydes ALD2 of the formula (VII) are esters of the 2,2-disubstituted 3-hydroxyaldehydes already described with suitable carboxylic acids.

Examples of suitable carboxylic acids are saturated aliphatic carboxylic acids such as formic acid, acetic acid, propionic acid, butyric acid, isobutyric acid, valeric acid, caproic acid, 2-ethylcaproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachic acid; monounsaturated aliphatic carboxylic acids such as palmitoleic acid, oleic acid, erucic acid; polyunsaturated aliphatic carboxylic acids such as linoleic acid, linolenic acid, eleostearic acid, arachidonic acid; cycloaliphatic carboxylic acids such as cyclohexanecarboxylic acid; arylaliphatic carboxylic acids such as phenylacetic acid; aromatic carboxylic acids such as benzoic acid, naphthoic acid, toluic acid, anisic acid; isomers of these acids; fatty acid mixtures from the industrial hydrolysis of natural oils and fats, for example rapeseed oil, sunflower oil, linseed oil, olive oil, coconut oil, oil palm kernel oil and oil palm oil; and monoalkyl and monoaryl dicarboxylates as obtained from the monoesterification of dicarboxylic acids such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxa-undecanoic acid and similar derivatives of polyethylene glycol, with alcohols such as methanol, ethanol, propanol, butanol, higher homologs and isomers of these alcohols.

Preferred aldehydes ALD2 of the formula (VII) are 3-benzoyloxy-2,2-di-methylpropanal, 3-cyclohexanoyloxy-2,2-dimethylpropanal, 2,2-dimethyl-3-(2-ethyl hexyloxy)propanal, 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal, and analogous esters of other 2,2-disubstituted 3-hydroxyaldehydes.

In a particularly preferred embodiment, $R^5$ is selected from the group consisting of phenyl, cyclohexyl, 2-ethylhexyl and the $C_{11}$-, $C_{13}$-, $C_{15}$- and $C_{17}$-alkyl groups.

The most preferred aldehyde of the formula (VII) is 2,2-dimethyl-3-lauroyloxypropanal.

In a preferred preparation method of the aldehyde ALD2 of the formula (VII), a 2,2-disubstituted 3-hydroxyaldehyde, for example 2,2-dimethyl-3-hydroxypropanal, which can be prepared, for example, from formaldehyde (or paraformaldehyde) and isobutyraldehyde, optionally in situ, is reacted with a carboxylic acid to give the corresponding ester. This esterification can be effected by known methods without the use of solvents, described, for example, in Houben-Weyl, "Methoden der organischen Chemie" [Methods of Organic Chemistry], vol. VIII, pages 516-528.

The aldehydes ALD2 of the formula (VII) are preferred over the aldehydes ALD1 of the formula (VI) owing to their ease of preparability.

In a particularly preferred embodiment, the aldehyde ALD of the formula (V) is odorless. An "odorless" substance is understood to mean a substance which has such a low odor that most humans cannot smell it, i.e. cannot perceive it with the nose.

Odorless aldehydes ALD of the formula (V) are firstly especially aldehydes ALD1 of the formula (VI) in which the $R^4$ radical is a hydrocarbon radical which has 11 to 30 carbon atoms and optionally contains heteroatoms.

Secondly, odorless aldehydes ALD of the formula (V) are especially aldehydes ALD2 of the formula (VII) in which the $R^5$ radical is either a linear or branched alkyl group having 11 to 30 carbon atoms, optionally with cyclic components, and optionally having at least one heteroatom, especially having at least one ether oxygen, or a mono- or polyunsaturated linear or branched hydrocarbon chain having 11 to 30 carbon atoms.

Examples of odorless aldehydes ALD2 of the formula (VII) are esterification products of the 2,2-disubstituted 3-hydroxyaldehydes already mentioned with carboxylic acids, for example lauric acid, tridecanoic acid, myristic acid, pentadecanoic acid, palmitic acid, margaric acid, stearic acid, nonadecanoic acid, arachic acid, palmitoleic acid, oleic acid, erucic acid, linoleic acid, linolenic acid, eleostearic acid, arachidonic acid, and fatty acid mixtures from the industrial hydrolysis of natural oils and fats, for example rapeseed oil, sunflower oil, linseed oil, olive oil, coconut oil, oil palm kernel oil and oil palm oil.

Preferred odorless aldehydes of the formula (VII) are 2,2-dimethyl-3-lauroyloxypropanal, 2,2-dimethyl-3-myristoyloxypropanal, 2,2-dimethyl-3-palmitoyloxypropanal and 2,2-dimethyl-3-stearoyloxypropanal. Particular preference is given to 2,2-dimethyl-3-lauroyloxypropanal.

The dialdimines A of the formula (I) have the property that they do not react with isocyanates in the absence of water. This means, more particularly, that their X, $Y^1$, $Y^2$ and $Y^3$ radicals do not have any moieties which are reactive with isocyanate groups. More particularly, X, $Y^1$, $Y^2$ and $Y^3$ have no hydroxyl groups, no primary or secondary amino groups, no mercapto groups and no other groups with active hydrogen.

The dialdimines A of the formula (I) also have the property that their aldimino groups cannot tautomerize to enamino groups, since they do not contain any hydrogen as substituents in a position to the carbon atom of the aldimino group. Owing to this property, they form, together with polyisocyanates P having aromatic isocyanate groups, particularly storable, i.e. substantially viscosity-stable, mixtures.

Dialdimines A which have been prepared proceeding from odorless aldehydes of the above-described particularly preferred embodiment are odorless. Such odorless dialdimines A are particularly preferred. For many applications, odorlessness is a great advantage or an indispensable prerequisite, especially in closed spaces such as in the interior of buildings or vehicles, and in large-area applications, for example in the case of application of floor coverings.

The dialdimines A are storage-stable under suitable conditions, especially with exclusion of moisture. On ingress of moisture, their aldimino groups can be hydrolyzed formally via intermediates to amino groups, releasing the corresponding aldehyde ALD of the formula (V) used to prepare the dialdimine A. Since this hydrolysis reaction is reversible and the chemical equilibrium is clearly on the aldimine side, it can be assumed that only some of the aldimino groups are hydrolyzed in the absence of groups reactive toward amines.

In the presence of isocyanate groups, the hydrolysis equilibrium shifts, since the aldimino groups being hydrolyzed react irreversibly with the isocyanate groups to give urea groups. The reaction of the isocyanate groups with the aldimino groups being hydrolyzed need not necessarily proceed via free amino groups. It will be appreciated that reactions with intermediates of the hydrolysis reaction are also possible. For example, it is conceivable that an aldimino group being hydrolyzed reacts directly in the form of a hemiaminal with an isocyanate group.

The dialdimine A is preferably present in the composition in a slightly superstoichiometric, stoichiometric or substoichiometric amount, based on the isocyanate groups. The dialdimine A of the formula (I) is advantageously present in the composition in such an amount that the ratio between the number of the aldimino groups and the number of the isocyanate groups is 0.1 to 1.1, especially 0.15 to 1.0, more preferably 0.2 to 0.9.

The dialdimines A used may also be mixtures of different dialdimines A. More particularly, it is possible to use mixtures of different dialdimines A which have been prepared proceeding from mixtures of different diamines DA of the formula (IV) and/or mixtures of different aldehydes ALD of the formula (V).

It is also possible that, in addition to at least one dialdimine A, further polyaldimines are present in the composition. For example, it is possible to react a diamine DA of the formula (IV) with a mixture comprising an aldehyde ALD and a dialdehyde. It is equally possible for this purpose to use an aldehyde mixture which, as well as an aldehyde ALD, comprises further aldehydes.

In addition to at least one polyisocyanate P having aromatic isocyanate groups and at least one dialdimine A of the formula (I), the composition may comprise further assistants and additives.

The composition reacts with water or moisture and is crosslinked as a result. When sufficient water is present to convert a majority of or all isocyanate groups, this gives rise to a cured composition which has excellent mechanical properties. The composition can therefore be described as "moisture-curing".

The composition may be present in the form of a one-component composition or in the form of a two-component composition. One-component compositions have the advantage that they are applicable without a mixing operation, whereas two-component compositions have the advantage that they cure more rapidly and may contain, as constituents, substances which are not storable together with isocyanates.

In one embodiment, the composition is present in the form of a one-component composition.

A preferred polyisocyanate P having aromatic isocyanate groups in the one-component composition is a polyurethane polymer PUP as has been described above.

Suitable assistants and additives for the one-component composition are, for example, the following substances:

plasticizers, for example carboxylic esters such as phthalates, for example dioctyl phthalate, diisononyl phthalate or diisodecyl phthalate, adipates, for example dioctyl adipate, azelates and sebacates, organic phosphoric and sulfonic esters or polybutenes;

solvents;

inorganic and organic fillers, for example ground or precipitated calcium carbonates optionally coated with stearates, carbon blacks, especially industrially produced carbon blacks (referred to hereinafter as "carbon black"), barite (BaSO4, also known as heavy spar), kaolins, aluminum oxides, aluminum hydroxides, silicas, especially high-dispersity silicas from pyrolysis processes, PVC powders or hollow spheres;

fibers, for example of polyethylene;

pigments, for example titanium dioxide or iron oxides;

catalysts which accelerate the hydrolysis of the aldimino groups, especially acids or compounds which are hydrolyzable to acids, for example organic carboxylic acids such as benzoic acid, salicylic acid or 2-nitrobenzoic acid, organic carboxylic anhydrides such as phthalic anhydride or hexahydrophthalic anhydride, silyl esters of organic carboxylic acids, organic sulfonic acids such as methanesulfonic acid, p-toluenesulfonic acid or 4-dodecylbenzenesulfonic acid, or further organic or inorganic acids;

catalysts which accelerate the reaction of the isocyanate groups with water, especially metal compounds, for example tin compounds such as dibutyltin diacetate, dibutyltin dilaurate, dibutyltin distearate, dibutyltin diacetylacetonate, dioctyltin dilaurate, dibutyltin dichloride and dibutyltin oxide, tin(II) carboxylates, stannoxanes such as laurylstannoxane, bismuth compounds such as bismuth(III) octoate, bismuth(III) neodecanoate or bismuth(III) oxinates; and tertiary amines, for example 2,2'-dimorpholinodiethyl ether and other morpholine ether derivatives;

rheology modifiers, for example thickeners or thixotropic agents, for example urea compounds, polyamide waxes, bentonites or fumed silicas;

reactive diluents and crosslinkers, for example monomeric polyisocyanates such as MDI, TDI, mixtures of MDI and MDI homologs (polymeric MDI or PMDI), and oligomers of these polyisocyanates, especially in the form of iso-cyanurates, carbodiimides, uretonimines, biurets, allophanates or iminooxadiazinediones, adducts of monomeric polyisocyanates with short-chain polyols, and also adipic dihydrazide and other dihydrazides, and also capped amines in the form of aldimines, ketimines, oxazolidines or enamines;

desiccants, for example molecular sieves, calcium oxide, high-reactivity isocyanates such as p-tosyl isocyanate, orthoformic esters, alkoxysilanes such as tetraethoxysilane, organoalkoxysilanes such as vinyltri-methoxysilane, and organoalkoxysilanes which have a functional group in the a position to the silane group;

adhesion promoters, especially organoalkoxysilanes, for example epoxysilanes, vinylsilanes, (meth)acryloylsilanes, isocyanatosilanes, carbamatosilanes, S-(alkylcarbonyl)mercaptosilanes and aldiminosilanes, and oligomeric forms of these silanes;

stabilizers against heat, light and UV radiation;

flame retardant substances;

surface active substances, for example wetting agents, leveling agents, devolatilizers or defoamers;

biocides, for example algicides, fungicides or substances which inhibit fungal growth.

It is advantageous to ensure that such additives do not impair the storage stability of the composition. This means that these additives must not trigger the reactions which lead to crosslinking, such as hydrolysis of the aldimino groups or crosslinking of the isocyanate groups, to a significant degree during storage. More particularly, this means that all of these additives should contain at most traces of water, if any. It may therefore be advisable to chemically or physically dry certain additives before they are mixed into the composition.

The one-component composition described preferably comprises, as well as at least one polyisocyanate P and at least one dialdimine A of the formula (I), at least one catalyst. The catalyst is especially one of the acids mentioned, such as benzoic acid or salicylic acid, or one of the metal compounds mentioned, or one of the tertiary amines mentioned. In particular, this catalyst is a catalyst which accelerates the hydrolysis of the aldimino groups, preferably an acid. It may quite possibly also be advantageous when different catalysts or different catalyst types are mixed with one another.

The one-component composition is preferably produced and stored with exclusion of moisture. In a suitable package or arrangement, impervious to ambient conditions, for example a vat, a pouch or a cartridge, it possesses an excellent storage stability. The terms "storage-stable" and "storage stability" in connection with a composition refers, in the present document, to the fact that the viscosity of the composition at a given application temperature and in the course of suitable storage within the period considered rises, if at all, at most to such an extent that the composition remains usable in the manner intended.

When the one-component composition comes into contact with moisture or water, the aldimino groups of the dialdimine A begin to undergo hydrolysis. The isocyanate groups present in the composition then react with the aldimino groups being hydrolyzed to release at least one aldehyde ALD of the formula (V). Excess isocyanate groups in relation to the aldimino groups react directly with water. As a result of these reactions, the composition crosslinks and ultimately cures to give a solid material. The reaction of the isocyanate groups with the aldimino groups being hydrolyzed need not necessarily proceed via free amino groups; reactions with intermediates of the hydrolysis reaction are also possible. For example, it is conceivable that an aldimino group being hydrolyzed reacts directly with an isocyanate group in the form of a hemiaminal.

The water required for the curing reaction may either originate from the air (air humidity), or else the composition can be contacted with a water-containing component, for example by spraying, or a water-containing component can be added to the composition in the course of application, especially by mixing it in.

The composition generally cures without bubbles, especially also at a high curing rate.

The curing rate can be influenced via the type and amount of one or more catalysts which may be present, by the temperature which exists in the course of curing and by the air humidity or the amount of water added.

When a water-containing component is added to the composition, the composition is cured in a greatly accelerated manner compared to curing exclusively with air humidity. In this case, the prolonged open time of the compositions described here is a particularly great advantage. In this way, compositions which possess very rapid curing coupled with a practicable open time are obtainable.

In a further embodiment, the composition is present in the form of a two-component composition. A two-component composition consists of a component K1 and of a component K2, which are stored separately from one another and are mixed with one another only briefly before application.

In one embodiment of a two-component composition, the polyisocyanate P having aromatic isocyanate groups and the dialdimine A of the formula (I) are part of the first component K1, and the second component K2 comprises compounds reactive toward isocyanate groups, especially water and/or polyols and/or polyamines.

In another embodiment of a two-component composition, the polyisocyanate P having aromatic isocyanate groups is part of the first component K1, whereas the second component K2 comprises the dialdimine A of the formula (I) and compounds reactive toward isocyanate groups, especially water and/or polyols and/or polyamines.

Component K2 preferably comprises at least one dialdimine A of the formula (I) and water.

Component K2 preferably comprises at least one dialdimine A of the formula (I) and at least one polyol, in which case preferably 0.3 to 1 equivalent of aldimino groups per equivalent of hydroxyl groups is present in the composition.

More preferably, component K2 comprises at least one dialdimine A of the formula (I), at least one polyol and water, in which case preferably 0.3 to 1 equivalent of aldimino groups per equivalent of hydroxyl groups of the polyol is present in the composition, and the water is preferably present in a substoichiometric amount based on the aldimino groups.

In both above-described embodiments of the two-component compositions, suitable polyols are the same commercial polyols as have already been mentioned above as suitable for preparing a polyurethane polymer PUP, and those low molecular weight di- or polyhydric alcohols as have been mentioned above as suitable for additional use in the preparation of a polyurethane polymer PUP. If the component K2 comprises water, it is advantageous when the amount of water is at most that required to hydrolyze the dialdimine A—and if appropriate any further latent hardeners. In addition, both components may comprise further assistants and additives as have already been mentioned above for a one-component composition. In the case of component K2, however, further assistants and additives are additionally also possible. More particularly, these are those assistants and additives which are storable only for a short period, if at all, with aromatic isocyanate groups. In particular, these are catalysts such as:

compounds of zinc, manganese, iron, chromium, cobalt, copper, nickel, molybdenum, lead, cadmium, mercury, antimony, vanadium, titanium, zirconium or potassium, such as zinc(II) acetate, zinc(II) 2-ethylhexanoate, zinc(11) laurate, zinc(II) oleate, zinc(II) naphthenate, zinc(II) acetylacetonate, zinc(II) salicylate, manganese(II) 2-ethylhexanoate, iron(III) 2-ethylhexanoate, iron(III) acetylacetonate, chromium(III) 2-ethylhexanoate, cobalt(II) naphthenate, cobalt(II) 2-ethylhexanoate, copper(II) 2-ethylhexanoate, nickel(II) naphthenate, phenylmercuric neodecanoate, lead(II) acetate, lead(II) 2-ethylhexanoate, lead(II) neodecanoate, lead(II) acetylacetonate, aluminum lactate, aluminum oleate, aluminum(III) acetylacetonate, diisopropoxytitanium bis(ethylacetoacetate), dibutoxytitanium bis(ethylacetoacetate), dibutoxytitanium bis(acetylacetonate), potassium acetate, potassium octanoate; tertiary amine compounds, such as triethylamine, tributylamine, N-ethyldiisopropylamine, N,N,N',N'-tetramethylethylenediamine, pentamethyldi-ethylenetriamine and higher homologs thereof, N,N,N',N'-tetramethylpropylenediamine, pentamethyldipropylenetriamine and higher homologs thereof, N,N,N',N'-tetramethyl-1,3-butanediamine, N,N,N'N'-tetramethyl-1,6-hexanediamine, bis(dimethylamino)methane, N,N-dimethyl-benzylamine, N,N-dimethylcyclohexylamine, N-methyldicyclohexylamine, N,N-dimethylhexadecylamine, bis(N,N-diethylaminoethyl) adipate, N,N-dimethyl-2-phenylethylamine, tris(3-dimethylaminopropyl)amine, 1,4-diazabicyclo[2.2.2]octane (DABCO), 1,8-diazabicyclo[5.4.0]undec-7-ene (DBU), diazabicyclo[4.3.0]nonene (DBN) N-methylmorpholine, N-ethylmorpholine, N-cocomorpholine, N,N'-dimethylpiperazine, N-methyl-N'-dimethylaminoethylpiperazine, bis (dimethylaminoethyl)piperazine, 1,3,5-tris(dimethylaminopropyl)hexahydrotriazine or bis(2-dimethylaminoethyl) ether; aromatic nitrogen compounds, such as 4-dimethylaminopyridine, N-methylimidazole, N-vinylimidazole or 1,2-dimethylimidazole; amidines and guanidines, such as 1,1,3,3-tetramethylguanidine; tertiary amine compounds containing active hydrogen atoms, such as triethanolamine, triisopropanolamine, N-methyldiethanolamine, N,N-dimethylethanolamine, 3-(dimethylamino)propyldiisopropanolamine, bis(3-(dimethylamino)propyl)iso-propanolamine, bis (3-dimethylaminopropyl)amine, 3-(dimethyl-amino) propylurea, Mannich bases, such as 2,4,6-tris(dimethylaminomethyl)phenol or 2,4,6-tris(3-(dimethylamino) propylaminomethyl)phenol, N-hydroxypropylimidazole, N-(3-aminopropyl)imidazole, and alkoxylation and polyalkoxylation products of these compounds, for example dimethylaminoethoxyethanol; organic ammonium compounds, such as benzyltrimethylammonium hydroxide, or alkoxylated tertiary amines; so-called "delayed action" catalysts, which are modifications of known metal or amine catalysts, such as reaction products of tertiary amines and carboxylic acids or phenols, for example of 1,4-diazabicyclo[2.2.2]octane or DBU and formic acid or acetic acid; and combinations of the compounds mentioned, especially of metal compounds and tertiary amines.

Component K2 preferably does not contain any isocyanate groups.

If the composition comprises further capped amines, especially aldimines, ketimines, oxazolidines or enamines, they may be part of component K1 and/or K2. Suitable aldimines are especially aldimines which are different than the dialdimines A and are obtainable proceeding from amines other than those of the formula (IV) and/or proceeding from aldehydes other than those of the formula (V). All these capped amines have the property of releasing amino groups when they are hydrolyzed, which react rapidly with isocyanate groups present.

The two components K1 and K2 are prepared separately from one another, with exclusion of moisture at least for component K1 The two components K1 and K2 are storage-stable separately from one another, i.e. they can be stored in a suitable package or arrangement, for example in a vat, a hobbock, a pouch, a bucket or a cartridge, over several months up to one year and longer before they are used, without their particular properties changing to a degree relevant for the use thereof.

The mixing ratio between the two components K1 and K2 is preferably selected such that the groups reactive toward isocyanate groups in components K1 and K2 are in a suitable ratio relative to the isocyanate groups of component K1. In the two-component composition, before the curing, suitably 0.1 to 1.1 equivalents, preferably 0.5 to 0.95 equivalent and more preferably 0.6 to 0.95 equivalent of the sum of the groups reactive toward isocyanates is present per equivalent of isocyanate groups, the aldimino groups and any further capped amino groups present being counted among the groups reactive toward isocyanates, and water not being counted among the groups reactive toward isocyanates. Excess isocyanate groups react especially directly with water, for example with air humidity.

Before or during the application of the two-component composition, the two components are mixed with one another by means of a suitable process. The mixing can be effected continuously or batchwise. The mixed composition is applied during the mixing or after the mixing, by contacting it with a solid surface, optionally by means of a suitable assistant. In doing this, it has to be ensured that not too much time lapses between the mixing of components K1 and K2 and the application, since this can result in problems, for example slowed or incomplete buildup of adhesion to the solid surface. The maximum period within which the mixed composition should be applied is referred to as the "pot life" or else as the "open time". Often, the open time is defined as the time within which the viscosity of the mixed composition doubles.

After the mixing of components K1 and K2, the curing commences. The dialdimine A of the formula (I) begins to hydrolyze in the manner already described and to react with the isocyanate groups as soon as it comes into contact with water. The water is either already present in the mixed composition—by virtue of it having been a constituent of component K2, or by virtue of it having been added to the composition before or during the mixing of the two components K1 and K2—or the water diffuses into the mixed composition in the form of air humidity. In the latter case, the dialdimine A reacts with the isocyanate groups from the outside inward, in parallel to the penetration of the air humidity into the composition. As already described, the reaction of the isocyanate groups with the aldimino groups being hydrolyzed need not necessarily proceed via free amino groups, but can also proceed via intermediates of the hydrolysis reaction. In the same way, the reactive groups are released from further latent hardeners which may be present in the composition. In addition, after the mixing of components K1 and K2, any compounds which are reactive toward isocyanate groups and are present in the composition, such as especially polyols and polyamines, react with the isocyanate groups. Excess isocyanate groups react especially directly with water. As a result of these reactions, the mixed composition crosslinks and ultimately cures to a solid material.

The curing generally proceeds without bubbles, especially at a high curing rate.

The curing rate can be influenced via the type and amount of one or more catalysts which may be present, via the temperature which prevails in the course of curing, and via the air humidity or the amount of water introduced via component K2.

Both in the one-component embodiment and in the two-component embodiment, the composition described possesses firstly a long open time and secondly a high curing rate. The combination of long open time and rapid curing is extremely desirable for many one-component and two-component applications.

For instance, the application of a one-component composition is often simpler when, after the application thereof, some time still remains in order to bring the composition into the desired form before a skin of partly cured material has formed on the surface. For example, a joint sealant should still be smoothable for a sufficiently long time after the application; an adhesive should still be displaceable without residue, in order to align the joint parts exactly; a coating or a covering should still be levelable or have, for example, rubber pellets, sand or colored chips scattered therein. Subsequently, the composition should, however, cure rapidly, in order that it can be subjected to load as soon as possible and/or in order that it can no longer be soiled by dust.

The application of a two-component composition is also often significantly simpler when it has a prolonged open time, given that both the mixing operation and the application of the composition, and any subsequent processing steps needed, for example in order to bring the composition into the form desired, proceed within the open time. A two-component floor covering, for example, which is mixed batchwise and then poured onto the substrate and leveled should have a long open time in order that the application can be performed exactly without time pressure. Subsequently, the composition should, though, cure rapidly in order to be subjectable to load as soon as possible. In the case of a floor covering, it is often an indispensable prerequisite that the covering has cured no later than the day after the application to such an extent that it can be walked upon, such that further operations can be performed.

In the case of a one-component composition, the measure used for the open time is typically the skin formation time. The "skin formation time" is understood to mean the period of time between the application of the composition and the formation of a skin of partly cured material on the surface of the applied composition. A measure determined for the curing rate of a one-component composition which cures from the outside inward is typically the so-called through-curing. In this case, for example, the thickness of the cured layer which has formed under defined conditions after a given period of time in the composition applied is measured; or the time which is needed to completely harden the composition applied in a given layer thickness under defined conditions is measured.

In the case of a two-component composition, a measure determined for the open time may be the period of time within which, after the mixing of the two components, for example, a particular viscosity rise (for example a doubling) has occurred, or the composition has a tack-free surface. A measure which can be determined for the curing rate of a two-component composition may, for example, be the rise in hardness, for example the Shore hardness, over the course of time.

By virtue of the inventive compositions, it is now possible to achieve prolonged open time and high curing rates combined with one another in one composition.

The effect of the prolonged open time coupled with high curing rate is clearly identifiable, as the examples which follow show. The reasons for this have not been studied in detail to date. However, it can be assumed that the effect can be attributed to the described asymmetry of the dialdimines A of the formula (I), or of the diamines DA of the formula (IV) derived therefrom. On ingress of water, at first almost exclusively the more reactive aldimino groups of the dialdimine A or the more reactive amino groups of the diamine DA react with the isocyanate groups of the polyisocyanate P. However, this does not lead to crosslinking of the composition but merely to a slight increase in viscosity, which barely limits the open time. Only when the more reactive aldimino groups or amino groups have been substantially consumed do the slower aldimino groups or amino groups also begin to react with further isocyanate groups, which now leads directly to the crosslinking of the composition and advances the curing significantly.

As described, the dialdimines A of the formula (I) are based on specific asymmetric diamines DA of the formula (IV) and tertiary aldehydes ALD of the formula (V). The different reactivity of the two amino groups in one diamine DA, the reason for which is the different substitution, is transferred directly to a dialdimine of this diamine DA, in which the two aldimino groups likewise have a different reactivity. In the particular case of a dialdimine A, the difference in reactivity in the aldimino groups, caused by the tertiary—and hence sterically demanding—structure of the parent aldehyde ALD of the aldimino group, is probably even enhanced further, by virtue of the sterically demanding aldehyde radical, additionally limiting the accessibility of the aldimino groups—especially when they are present in semihydrolyzed form as hemiaminal groups—and hence lowering the reactivity of the slower aldimino group to a greater than a proportional degree compared to that of the faster aldimino group.

The use of the preferred odorless dialdimines A makes it possible to obtain, in particular, also compositions which are odorless before, during and after curing. This property constitutes a great advantage over the prior art and extends the possible uses of these compositions significantly.

The compositions described are particularly suitable as one- and two-component adhesives, sealants, potting compositions or coatings, especially floor coatings. They are especially suitable as elastic adhesives, elastic sealants, elastic potting compositions or elastic coatings. They more preferably find use as elastic sealants, since the use of the specific dialdimines A in the cured state gives rise to particularly flexible properties.

More particularly, the composition described is suitable as a flexible sealant for sealing joints of all kinds, especially movement joints in built structures. So-called movement joints are joints which are present at suitable sites and in suitable widths in built structures in order to bridge movements between components made of rigid construction materials such as concrete, stone, plastic and metal. Such movements arise firstly through shocks and secondly through temperature changes. The rigid materials contract under cold conditions, which makes the joints wider, and they expand under hot conditions, which makes the joints narrower. A sealant which is intended to seal such joints in a lasting manner must have flexible properties in order to transmit a minimum amount of force to the substrate when it is expanded and when it is compressed in the joint, and thus subjected to a minimum amount of stress. Flexible properties are understood here to mean a high extensibility coupled with a low extension stress value and a good resilience. The term "extension stress" refers to the stress which acts in a material in the extended state.

Particularly low extension stress values in the cured state are possessed by sealant compositions which comprise at least one dialdimine A in which X in the formula (I) is the radical of a diamine DA selected from a group consisting of TMD, IPDA and 1,5-diamino-2-butyl-2-ethylpentane.

In a further aspect, the invention relates to a process for adhesive bonding a substrate S1 to a substrate S2. This process comprises the steps of:
 i) applying an above-described composition to a substrate S1;
 ii) contacting the composition applied with a substrate S2 within the open time of the composition;
 or
 i') applying an above-described composition to a substrate S1 and to a substrate S2;
 ii') contacting the compositions applied with one another within the open time of the composition;

said substrate S2 consisting of the same material as, or a different material than, the substrate S1.

The invention additionally relates to a process for sealing, which comprises the step of:

i″) applying an above-described composition between a substrate S1 and a substrate S2, such that the composition is in contact with the substrate S1 and the substrate S2;

said substrate S2 consisting of the same material as, or a different material than, the substrate S1.

The intermediate space between substrate S1 and S2 in the process for sealing is referred to by the person skilled in the art as a joint. Typically, the composition is injected here from cartridges into the prepared joints and then smoothed by hand, by moving a tool usually wetted with soapy water, for example a spatula, or the user's finger wetted by soapy water, over the applied sealant such that it has a smooth and even, very slightly inwardly curved surface. Since the user often only smooths the sealant applied when he or she has applied a relatively large joint area, a relatively long time, for example up to one hour, may pass between the application and the smoothing of the sealant. In order to ensure clean smoothing, it is, however, indispensable that no skin has formed yet on the sealant surface within this time. Sealants with a short open time are therefore undesirable for sealant users. In spite of this, it is important that the sealant cures rapidly after the long open time and forms a tack-free surface, since the risk of soiling by, for example, dust and sand is great in the case of a tacky, uncured sealant surface. On the other hand, a sealant composition in the cured state should have a minimum level of flexible properties. These requirements can be met exceptionally well by the composition described.

The invention finally relates to a process for coating a substrate S1 which comprises the step of:

i‴) applying a composition as described herein to a substrate S1 within the open time of the composition.

In all these processes, the substrates S1 and/or S2 may be a multitude of materials. More particularly, they are an inorganic substrate such as glass, glass ceramic, concrete, mortar, brick, tile, gypsum, or natural stone such as granite or marble; a metal or an alloy, such as aluminum, steel, nonferrous metal, galvanized metal; an organic substrate such as wood, a plastic such as PVC, polycarbonate, PMMA, polyethylene, polypropylene, polyester, epoxy resin, polyurethane (PU); a coated substrate such as powder-coated metal or alloy; or a paint or a coating, especially an automotive topcoat.

In all these processes, the substrate S1 and/or the substrate S2 may have been pretreated before the adhesive bonding or sealing or coating, especially with a primer or an adhesion promoter composition. Such pretreatments comprise especially physical and/or chemical cleaning and activation processes, for example grinding, sandblasting, brushing, corona treatment, plasma treatment, flaming, etching or the like, or treatment with detergents or solvents, or the application of an adhesion promoter, of an adhesion promoter solution or of a primer.

These described processes for adhesive bonding, sealing or coating give rise to an article.

This article is especially a built structure, especially a built structure in construction or civil engineering, or an industrial good or a consumer good, especially a window, a domestic appliance, or a mode of transport, especially a water or land vehicle, preferably an automobile, a bus, a truck, a train or a ship, or an installable component of a mode of transport.

EXAMPLES

Description of the Test Methods

Infrared spectra were measured on an FT-IR 1600 instrument from Perkin-Elmer (horizontal ATR analysis unit with ZnSe crystal); the substances were applied undiluted as a film. The absorption bands are reported in wavenumbers ($cm^{-1}$) (measurement window: 4000-650 $cm^1$).

$^1H$ NMR spectra were measured on a Bruker DPX-300 spectrometer at 300.13 MHz. The chemical shifts δ are reported in ppm relative to tetramethylsilane (TMS), coupling constants J are reported in Hz. True coupling patterns and pseudo coupling patterns were not distinguished.

The viscosity was measured on a thermostated Physica UM cone-plate viscometer (cone diameter 20 mm, cone angle 1°, cone tip-plate distance 0.05 mm, shear rate 10 to 1000 $s^{-1}$).

The amine content of the dialdimines prepared, i.e. the content of capped amino groups in the form of aldimino groups, was determined titrimetrically (with 0.1N $HClO_4$ in glacial acetic acid, using crystal violet), and is always reported in mmol N/g.

a) Preparation of Dialdimines

Dialdimine A-1

A round-bottom flask was initially charged under a nitrogen atmosphere with 55.0 g (0.19 mol) of distilled 2,2-dimethyl-3-lauroyloxypropanal. With vigorous stirring, 15.6 g (0.18 mol of N) of 1-amino-3-aminomethyl-3,5,5-trimethylcyclohexane (=isophoronediamine, IPDA; Vestamin® IPD, Degussa; amine content 11.68 mmol N/g) were added slowly from a dropping funnel, in the course of which the mixture heated up and became increasingly cloudy. Thereafter, the volatile constituents were removed under reduced pressure (10 mbar, 80° C.).

Yield: 67.1 g of a clear colorless oil with an amine content of 2.73 mmol N/g and a viscosity of 190 mP·s at 20° C.

IR: 2952, 2922, 2852, 2819sh, 1738 (C=O), 1666 (C=N), 1464, 1418, 1394, 1378, 1364, 1350, 1298, 1248, 1236sh, 1158, 1112, 1048, 1020, 1000, 938, 928, 910, 894, 868, 772, 722.

$^1H$ NMR ($CDCl_3$, 300 K): δ 7.59 and 7.57 (2×s, total 1H, CH=N ([isomers]), 7.47 (s, 1H, CH=N), 4.03 and 4.01 (2×s, 2×2H, C(CH$_3$)$_2$—CH$_2$—O), 3.37 (m, 1H, N—CH$^{Cy}$), 3.08 (dd, 2H, J≈11.1, N—CH$_2$—C$^{Cy}$), 2.30 (t, 4H, J 7.5, OC(O)—CH$_2$—CH$_2$), 1.61 (m, 4H, OC(O)—CH$_2$—CH$_2$), 1.60-0.85 (m, 65H, remaining CH).

Dialdimine A-2

A round-bottom flask was initially charged under a nitrogen atmosphere with 55.0 g (0.19 mol) of distilled 2,2-dimethyl-3-lauroyloxypropanal. With vigorous stirring, 9.4 g (0.18 mol of N) of 1,3-diaminopentane (DAMP; Dytek® EP Diamine, Invista; amine content 19.42 mmol N/g) were added slowly from a dropping funnel, in the course of which the mixture heated up and became increasingly cloudy. Thereafter, the volatile constituents were removed under reduced pressure (10 mbar, 80° C.). Yield: 60.9 g of a clear, pale yellow oil with an amine content of 3.01 mmol N/g and a viscosity of 50 mPa·s at 20° C.

IR: 2955sh, 2922, 2868sh, 2852, 1737 (C=O), 1666 (C=N), 1466, 1419, 1394, 1373, 1346, 1300, 1248, 1233, 1159, 1112, 1057, 1019, 1000, 935, 884, 769br, 722.

Dialdimine A-3

A round-bottom flask was initially charged under a nitrogen atmosphere with 50.0 g (0.18 mol) of distilled 2,2-dimethyl-3-lauroyloxypropanal. With vigorous stirring, 15.8 g (0.17 mol of N) of 1,5-diamino-2-butyl-2-ethylpentane (amine content 10.52 mmol N/g) were added slowly from a dropping funnel, in the course of which the mixture heated up and became increasingly cloudy. Thereafter, the volatile constituents were removed under reduced pressure (10 mbar, 80° C.). Yield: 62.6 g of a clear, almost colorless oil with an amine content of 2.64 mmol N/g and a viscosity of 100 mPa·s at 20° C.

IR: 2951, 2922, 2871sh, 2852, 2831sh, 1738(C=O), 1669 (C=N), 1463, 1418, 1393, 1375, 1341, 1302, 1248, 1234, 1159, 1112, 1019, 999, 935, 874sh, 848sh, 777, 722.

Dialdimine A-4

A round-bottom flask was initially charged under a nitrogen atmosphere with 79.4 g (0.28 mol) of distilled 2,2-dimethyl-3-lauroyloxypropanal. With vigorous stirring, 20.0 g (0.25 mol of N) of 2,2(4),4-trimethylhexamethylenediamine (Vestamin® TMD, Degussa; amine content 12.64 mmol N/g) were added slowly from a dropping funnel, in the course of which the mixture heated up and became increasingly cloudy. Thereafter, the volatile constituents were removed under reduced pressure (10 mbar, 80° C.). Yield: 94.4 g of a clear, pale yellow oil with an amine content of 2.66 mmol N/g and a viscosity of 63 mPa·s at 20° C.

IR: 2954, 2920, 2852, 2822sh, 1737 (C=O), 1668 (C=N), 1466, 1418, 1392sh, 1374, 1365, 1348, 1301sh, 1248, 1234, 1158, 1112, 1020, 999, 932, 867, 722.

Dialdimine A-5

A round-bottom flask was initially charged under a nitrogen atmosphere with 24.3 g (85 mmol) of distilled 2,2-dimethyl-3-lauroyloxypropanal. With vigorous stirring, 5.0 g (81 mmol of N) of 4-aminomethylaniline (=4-aminobenzylamine; amine content 16.24 mmol N/g) were added slowly from a dropping funnel, in the course of which the mixture heated up and became slightly cloudy. Thereafter, the volatile constituents were removed under reduced pressure (10 mbar, 80° C.). Yield: 27.6 g of a clear, pale yellow oil with an amine content of 2.93 mmol N/g and a viscosity of 125 mPa·s at 20° C.

Dialdimine A-6 (Comparative)

A round-bottom flask was initially charged under a nitrogen atmosphere with 60.0 g (0.21 mol) of distilled 2,2-dimethyl-3-lauroyloxypropanal. With vigorous stirring, 11.8 g (0.20 mol of N) of 1,5-diamino-2-methylpentane (MPMD; Dytek®A, Invista; amine content 17.04 mmol N/g) were added slowly from a dropping funnel, in the course of which the mixture heated up and became increasingly cloudy. Thereafter, the volatile constituents were removed under reduced pressure (10 mbar, 80° C.). Yield: 68.2 g of a clear, pale yellow oil with an amine content of 2.94 mmol N/g and a viscosity of 53 mPa·s at 20° C.

Dialdimine A-7 (Comparative)

A round-bottom flask was initially charged under a nitrogen atmosphere with 80.9 g (0.27 mol) of distilled 2,2-dimethyl-3-lauroyloxypropanal. With vigorous stirring, 25.2 g (0.26 mol of N) of 3(4),8(9)-bis-(aminomethyl)tricyclo[5.2.1.0$^{2,6}$]-decane (TCD-diamine, Celanese; amine content 10.23 mmol N/g) were added slowly from a dropping funnel, in the course of which the mixture heated up and became increasingly cloudy. Thereafter, the volatile constituents were removed under reduced pressure (10 mbar, 80° C.). Yield: 100.8 g of a clear, almost colorless oil with an amine content of 2.56 mmol N/g.

Dialdimine A-8 (Comparative)

A round-bottom flask was initially charged under a nitrogen atmosphere with 74.3 g (0.26 mol) of distilled 2,2-dimethyl-3-lauroyloxypropanal. With vigorous stirring, 30.0 g (0.25 mol of N) of polyetherdiamine (polyoxypropylenediamine with a mean molecular weight of approx. 240 g/mol; Jeffamine® D-230, Huntsman; amine content 8.29 mmol N/g) were added slowly from a dropping funnel, in the course of which the mixture heated up and became increasingly cloudy. Thereafter, the volatile constituents were removed under reduced pressure (10 mbar, 80° C.). Yield: 99.5 g of a clear, pale yellow oil with an amine content of 2.50 mmol N/g.

Dialdimine A-9 (Comparative)

A round-bottom flask was initially charged under a nitrogen atmosphere with 50.9 g (0.18 mol) of distilled 2,2-dimethyl-3-lauroyloxypropanal. With vigorous stirring, 10.0 g (0.17 mol of N) of 1,6-hexamethylenediamine (BASF; amine content 17.04 mmol N/g) were added slowly from a heated dropping funnel, in the course of which the mixture heated up and became increasingly cloudy. Thereafter, the volatile constituents were removed under reduced pressure (10 mbar, 80° C.). Yield: 57.7 g of a clear, pale yellow oil with an amine content of 2.94 mmol N/g.

b) Production of Compositions

Examples to 5 and Comparative Examples 6 to 8

For each example, the particular constituents according to table 1 were weighed in the parts by weight specified without preceding drying into a screw top polypropylene cup and mixed by means of a centrifugal mixer (SpeedMixer™ DAC 150, FlackTek Inc.; 1 min at 2500 rpm); the mixture was transferred immediately into an internally coated aluminum tube which was sealed airtight.

The polyurethane polymer PUP-1 was prepared as follows:

1300 g of polyoxypropylenediol (Acclaim® 4200 N, Bayer; OH number 28.5 mg KOH/g), 2600 g of polyoxypropylenepolyoxyethylenetriol (Caradol® MD34-02, Shell; OH number 35.0 mg KOH/g), 600 g of 4,4'-methylenediphenyl diisocyanate (MDI; Desmodur® 44 MC L, Bayer) and 500 g of diisodecyl phthalate (DIDP; Palatinol® Z, BASF) were converted at 80° C. to an NCO-terminated polyurethane polymer with a content of free isocyanate groups of 2.05% by weight and a viscosity of 31.6 Pa·s at 20° C.

The ratio between the isocyanate groups and the aldimino groups for all examples is 1.0/0.70.

TABLE 1

Composition of examples 1 to 5 and of comparative examples 6 to 8.

| | Example | | | | | | | |
|---|---|---|---|---|---|---|---|---|
| | 1 | 2 | 3 | 4 | 5 | 6 (comp.) | 7 (comp.) | 8 (comp.) |
| PU polymer PUP-1 | 50.0 | 50.0 | 50.0 | 50.0 | 50.0 | 50.0 | 50.0 | 50.0 |
| Dialdimine | A-1, 6.26 | A-2, 5.67 | A-3, 6.47 | A-4, 6.42 | A-5, 5.82 | A-6, 5.81 | A-7, 6.67 | A-8, 6.84 |
| Acid catalyst[a] | 0.1 | 0.1 | 0.1 | 0.1 | 0.1 | 0.1 | 0.1 | 0.1 |

[a]Salicylic acid (5% by weight in dioctyl adipate).

The compositions thus obtained were tested for storage stability, open time and curing rate.

The storage stability was determined via the change in viscosity during storage under hot conditions. To this end, the composition was stored at 60° C. in the closed tube in an oven, and the viscosity was measured at 20° C. for a first time after 12 hours and for a second time after 7 days of storage time. The storage stability is calculated from the percentage increase in the second viscosity value from the first.

A measure employed for the open time was the skin formation time ("tack-free time"). To measure the skin formation time, a small portion of the composition at room temperature, which had been stored at 40° C. over 2 hours, was applied in a layer thickness of approx. 2 mm to cardboard, and the time taken until, when the surface of the composition is tapped lightly by means of an LDPE pipette, no residues remained on the pipette for the first time was determined at 23° C. and 50% relative air humidity.

A measure employed for the curing rate was the time until the composition had cured through. The time until through-curing was determined by pouring the composition as a film in a layer thickness of 5 mm into a PTFE mold, which was stored under standard climatic conditions, and, by periodically raising the film edge, the time taken until the film was removable without residue for the first time was determined in days.

The results of the tests are listed in table 2.

TABLE 2

Properties of examples 1 to 5 and comparative examples 6 to 8.

| | Example | | | | | | | |
|---|---|---|---|---|---|---|---|---|
| | 1 | 2 | 3 | 4 | 5 | 6 (comp.) | 7 (comp.) | 8 (comp.) |
| Viscosity after 12 h[a] | 22.8 | 27.1 | 21.7 | 19.7 | 23.8 | 22.4 | 23.1 | 20.5 |
| Viscosity after 7 d[a] | 27.0 | 30.6 | 25.0 | 23.2 | 26.4 | 26.2 | 27.7 | 25.2 |
| Viscosity increase[b] | 18% | 13% | 15% | 18% | 11% | 17% | 20% | 23% |
| Skin formation time (min) | 70 | 150 | 90 | 65 | 60 | 40 | 45 | 45 |
| Through-curing (d) | 2.5 | 3 | 3 | 3 | 2.5 | 2.5 | 2.5 | 2.5 |

[a] in Pa·s, storage at 60° C.
[b] = (viscosity after 7 d/viscosity after 12 h − 1) × 100%.

Examples 9 and 10 and Comparative Example 11

For each example, the particular constituents according to table 3 were weighed in the parts by weight specified without preceding drying into a screw top polypropylene cup, and mixed by means of a centrifugal mixer (SpeedMixer™ DAC 150, FlackTek Inc.; 1 min. at 2500 rpm); the mixture was transferred immediately into an internally coated aluminum tube which was sealed airtight.

The polyurethane polymer PUP-2 was prepared as follows:

180 g of polyoxypropylenediol (Acclaim® 4200 N, Bayer; OH number 28.5 mg KOH/g), 50 g of polyoxypropylenetriol (Acclaim® 6300, Bayer; OH number 28.0 mg KOH/g) and 21 g of tolylene diisocyanate (TDI; Desmodur® T 80 P, Bayer) were converted at 80° C. to an NCO-terminated polyurethane polymer with a content of free isocyanate groups of 1.89% by weight and a viscosity of 13.8 Pa·s at 20° C.

The ratio between the isocyanate groups and the aldimino groups for all examples is 1.0/0.70.

TABLE 3

Composition of examples 9 and 10 and of comparative example 11

| | Example | | |
|---|---|---|---|
| | 9 | 10 | 11 (comparative) |
| Polyurethane polymer PUP-2 | 50.0 | 50.0 | 50.0 |
| Dialdimine | A-1, 5.77 | A-2, 5.23 | A-8, 6.31 |
| Acid catalyst[a] | 0.1 | 0.1 | 0.1 |

[a] Salicylic acid (5% by weight in dioctyl adipate).

The compositions thus obtained were tested for storage stability, open time (skin formation time) and curing rate (through-curing), as described in example 1.

The results of the tests are listed in table 4.

TABLE 4

Properties of examples 9 and 10 and of comparative example 11.

| | Example | | |
|---|---|---|---|
| | 9 | 10 | 11 (comparative) |
| Viscosity after 12 h (Pa·s)[a] | 12.8 | 13.0 | 12.0 |
| Viscosity after 7 d (Pa·s)[a] | 15.6 | 15.6 | 14.0 |
| Viscosity increase[b] | 22% | 20% | 17% |
| Skin formation time (min) | 130 | 295 | 70 |
| Through-curing (d) | 4 | 3.5 | 3 |

[a] storage at 60° C.
[b] (viscosity after 7 d/viscosity after 12 h − 1) × 100%.

Examples 12 to 15 and Comparative Examples 16 to 18

One-Component Elastic Adhesives

For each example, the particular constituents according to table 5 were processed in the parts by weight specified without preceding drying in a vacuum mixer with exclusion of moisture to give a homogeneous paste, which was immediately transferred into an internally coated aluminum cartridge and the cartridge was sealed airtight.

The polyurethane polymer PUP-3 was prepared as follows:

3560 g of polyoxypropylenediol (Acclaim® 4200 N, Bayer; OH number 28.1 mg KOH/g), 1000 g of polyoxypropylenetriol (Acclaim® 6300, Bayer; OH number 28.0 mg KOH/g) and 440 g of tolylene diisocyanate (TDI; Desmodur®T 80 P, Bayer) were converted at 80° C. to an NCO-terminated polyurethane polymer with a content of free isocyanate groups determined by titrimetric means of 2.19% by weight and a viscosity at 20° C. of 10 Pa·s.

The thickener was prepared as follows:

A vacuum mixer was initially charged with 3000 g of diisodecyl phthalate (DIDP; Palatinol® Z, BASF) and 480 g of 4,4'-methylenediphenyl diisocyanate (MDI; Desmodur® 44 MC L, Bayer) and heated gently. Then, with vigorous stirring, 270 g of monobutylamine were slowly added dropwise. The paste which formed was stirred under reduced pressure with cooling for a further hour.

The ratio between the isocyanate groups and the aldimino groups for all examples is 1.0/0.67.

TABLE 5

Composition of the one-component elastic adhesives of examples 12 to 15 and of comparative examples 16 to 18.

| | Example | | | | | | |
|---|---|---|---|---|---|---|---|
| | 12 | 13 | 14 | 15 | 16 (comp.) | 17 (comp.) | 18 (comp.) |
| PU polymer PUP-3 | 24.0 | 24.0 | 24.0 | 24.0 | 24.0 | 24.0 | 24.0 |
| Dialdimine | A-1, 3.07 | A-2, 2.78 | A-3, 3.18 | A-4, 3.15 | A-6, 2.85 | A-7, 3.27 | A-8, 3.36 |
| Plasticizer[a] | 1.93 | 2.22 | 1.82 | 1.85 | 3.15 | 1.73 | 1.64 |
| Chalk | 38.0 | 38.0 | 38.0 | 38.0 | 38.0 | 38.0 | 38.0 |
| Thickener | 28.0 | 28.0 | 28.0 | 28.0 | 28.0 | 28.0 | 28.0 |
| Titanium dioxide | 4.5 | 4.5 | 4.5 | 4.5 | 4.5 | 4.5 | 4.5 |
| Epoxysilane[b] | 0.2 | 0.2 | 0.2 | 0.2 | 0.2 | 0.2 | 0.2 |
| Acid catalyst[c] | 0.3 | 0.3 | 0.3 | 0.3 | 0.3 | 0.3 | 0.3 |

[a]Diisodecyl phthalate (DIDP; Palatinol ® Z, BASF).
[b]3-glycidoxypropyltriethoxysilane (Dynasylan ® GLYEO, Degussa).
[c]Salicylic acid (5% by weight in dioctyl adipate).

The one-component elastic adhesives thus obtained were tested for application properties, open time, curing rate and mechanical properties after curing.

Measures employed for the application properties were the sagging and the threading. To determine the sagging, the adhesive was applied by means of a cartridge pistol through a triangular nozzle as a horizontal triangular bead with a base diameter of 8 mm and a height (distance of the triangular tip from the base) of 20 mm onto a vertical piece of cardboard. After 5 minutes, the extent to which the tip had lowered, i.e. had moved away from the original position in the middle of the triangular bead, was measured. It was assessed as "very good" when the tip was in a completely or nearly unchanged position, and as "good" when the tip was between the middle and the end of the base. Threading was determined qualitatively by applying a little adhesive by means of a cartridge pistol to a piece of cardboard secured to a wall, the cartridge pistol was pulled away from the adhesive applied at the end of application by pulling it back rapidly, and the length of the thread which remained at the severance point was measured.

A measure employed for the open time was the skin formation time ("tack-free time"). The skin formation time was determined as described in example 1.

A measure employed for the curing rate was the time until the adhesive had cured through. The time until through-curing was studied by applying the adhesive by means of a cartridge pistol through a round tip (opening 10 mm) as a horizontal, free-hanging cone with a length of approx. 50 mm and a thickness in the middle of 30 mm to a piece of cardboard secured to a wall, left under standard climatic conditions over 7 days, then cut vertically down the middle, and the thickness of the cured adhesive layer was measured with a ruler.

To determine the mechanical properties after the curing, the Shore A hardness, the tensile strength, the elongation at break and the extension stress were measured at 100%. The Shore A hardness was determined to DIN 53505 on specimens cured under standard climatic conditions over 14 days. To test the further mechanical properties, the adhesive, 2 hours after the production, was pressed by means of a press to a film of thickness approx. 2 mm, and the film was cured under standard climatic conditions over 14 days, and tested to DIN EN 53504 for tensile strength, elongation at break and extension stress at 100% (pulling speed: 200 mm/min).

All adhesives cured fully without bubbles.

The results of the tests are listed in table 6.

TABLE 6

Properties of the elastic adhesives of examples 12 to 15 and of comparative examples 16 to 18.

| | Example | | | | | | |
|---|---|---|---|---|---|---|---|
| | 12 | 13 | 14 | 15 | 16 (comp.) | 17 (comp.) | 18 (comp.) |
| Sagging | very good | very good | very good | very good | very good | very good | good |
| Threading (cm) | 10 | 8 | 4 | 5 | 10 | 4 | 4 |
| Skin formation time (min) | 105 | 280 | 180 | 100 | 55 | 60 | 65 |
| Through-curing (mm) | 9 | 8 | 8 | 8 | 11 | 10 | 4 |
| Shore A hardness | 38 | 42 | 34 | 31 | 39 | 37 | 31 |
| Tensile strength (MPa) | 2.1 | 2.1 | 1.4 | 1.7 | 2.1 | 1.9 | 1.8 |
| Elongation at break (%) | 1350 | 1070 | 1010 | 1040 | 1140 | 1310 | 1040 |
| Extension stress at 100% (MPa) | 1.00 | 1.46 | 0.93 | 1.01 | 1.39 | 1.04 | 1.44 |

Example 19 and Comparative Examples 20 to 21

One-Component Elastic Sealants

For each example, the particular constituents according to table 7 in the parts by weight specified were processed without preceding drying in a vacuum mixer with exclusion of moisture to give a homogeneous paste, which was immediately transferred into an internally coated aluminum cartridge which was sealed airtight.

The polyurethane polymer PUP-4 was prepared as follows:

1190 g of polyoxypropylenediol (Acclaim® 4200 N, Bayer; OH number 28.1 mg KOH/g), 620 g of polyoxypropylenepolyoxyethylenetriol (Caradol® MD34-02, Shell; OH number 35.0 mg KOH/g) and 190 g of 2,4-tolylene diisocyanate (Scuranate® T-100, Lyondell) were converted at 80° C. to an NCO-terminated polyurethane polymer with a content of free isocyanate groups determined by titrimetric means of 2.32% by weight and a viscosity at 20° C. of 5 Pa·s. The thickener was prepared as described in example 12.

The ratio between the isocyanate groups and the aldimino groups for all examples is 1.0/0.67.

TABLE 7

Composition of the one-component elastic sealants of examples 19 and of comparative examples 20 to 21.

| | Example | | |
|---|---|---|---|
| | 19 | 20 (comparative) | 21 (comparative) |
| Polyurethane polymer PUP-4 | 24.0 | 24.0 | 24.0 |
| Dialdimine | A-1, 3.26 | A-7, 3.47 | A-8, 3.56 |
| Plasticizer[a] | 1.74 | 1.53 | 1.44 |
| Chalk | 38.0 | 38.0 | 38.0 |
| Thickener | 28.0 | 28.0 | 28.0 |
| Titanium dioxide | 4.5 | 4.5 | 4.5 |
| Epoxysilane[b] | 0.2 | 0.2 | 0.2 |
| Acid catalyst[c] | 0.3 | 0.3 | 0.3 |

[a]Diisodecyl phthalate (DIDP; Palatinol ® Z, BASF).
[b]3-Glycidoxypropyltri-ethoxysilane (Dynasylan ® GLYEO, Degussa).
[c]Salicylic acid (5% by weight in dioctyl adipate).

The one-component elastic sealants thus obtained were tested for application properties (sagging, threading), open time (skin formation time), curing rate (through-curing) and mechanical properties after curing (Shore A hardness, tensile strength, elongation at break, extension stress at 100%) were tested as described for example 12.

In addition, the sealants were tested qualitatively for tack. This was done by, one day or 3 days after the application thereof, pressing the cured Shore A specimens with the thumb and then determining how long the specimen remained adhering on the thumb as the hand was raised. The tack was then assessed as high (specimen remains adhering for more than 3 seconds), medium (specimen remains adhering for about 3 seconds), low (specimen remains adhering for 1 to 2 seconds) and none (specimen remains adhering for less than 1 second).

All sealants cured completely without bubbles.

The results of the tests are listed in table 8.

TABLE 8

Properties of the one-component elastic adhesives of example 19 and of comparative examples 20 to 21.

| | Example | | |
|---|---|---|---|
| | 19 | 20 (comparative) | 21 (comparative) |
| Sagging | very good | very good | very good |
| Threading (cm) | 5 | 4 | 8 |
| Skin formation time (min) | 250 | 95 | 70 |
| Through-curing (mm) | 8 | 7 | 3 |
| Shore A hardness | 30 | 32 | 23 |
| Tensile strength (MPa) | 2.0 | 2.0 | 1.4 |
| Elongation at break (%) | 1180 | 1150 | 1200 |
| Extension stress at 100% (MPa) | 0.35 | 0.42 | 0.34 |
| Tack after 1 day | low | low | high |
| Tack after 3 days | none | none | medium |

Examples 22 to 23 and Comparative Example 24

Two-Component Elastic Adhesives

For each example, component K1 was prepared as follows:

In a planetary mixer, under a nitrogen atmosphere, 200 g of partly carbodiimidated 4,4'-methylenediphenyl diisocyanate (Desmodur® CD, Bayer; NCO content=29.5% by weight) were mixed with 280 g of polyurethane polymer PUP-1 and 20 g of hydrophobic fumed silica (Aerosil® R972, Degussa) to give a homogenous paste, and transferred into cartridges.

Subsequently, component K2 according to table 9 was weighed in the parts by weight specified without preceding drying into a polypropylene cartridge and mixed by means of a centrifugal mixer (SpeedMixer™ DAC 150, FlackTek Inc.; 2 min. at 3000 rpm) to give a homogeneous paste. To this end, the parts by weight of component K1 specified in table 9 were added and mixed in immediately (30 sec at 3000 rpm).

The polyurethane polymer PUP-1 was prepared as described in example 1. The thickener was prepared as described in example 12.

The ratio between the isocyanate groups of component K1 and the sum of the reactive groups (hydroxyl groups, primary amino groups and aldimino groups) of component K2 is always 0.91/1. The ratio between the water and the aldimino groups in component K2 is always 0.6/1.

TABLE 9

Composition of the two-component elastic adhesives of examples 22 to 23 and of comparative example 24.

| | Example | | |
|---|---|---|---|
| | 22 | 23 | 24 (comparative) |
| Component K1 | 18.2 | 18.7 | 18.4 |
| Component K2: | | | |
| Polyol[a] | 47.0 | 47.0 | 47.0 |
| Dialdimine | A-1, 4.7 | A-2, 4.7 | A-9, 4.7 |
| Diamine[b] | 1.0 | 1.0 | 1.0 |
| Thickener | 10.0 | 10.0 | 10.0 |
| Amine catalyst[c] | 0.1 | 0.1 | 0.1 |

TABLE 9-continued

Composition of the two-component elastic adhesives of examples 22 to 23 and of comparative example 24.

| | Example | | |
|---|---|---|---|
| | 22 | 23 | 24 (comparative) |
| Acid catalyst[d] | 0.2 | 0.2 | 0.2 |
| Water | 0.139 | 0.153 | 0.145 |
| Molecular sieve[e] | 2.0 | 2.0 | 2.0 |
| Chalk | 35.0 | 35.0 | 35.0 |

[a]Low monool polyoxypropylenepolyoxyethylenediol (Preminol ® S-X5006, Asahi Glass; OH number 28.0 mg KOH/g).
[b]1,3-xylylenediamine.
[c]DABCO ® 33-LV, Air Products.
[d]Salicylic acid (5% by weight in dioctyl adipate).
[e]8 Å molecular sieve (Purmol ® 13, Zeochem Europe).

The two-component elastic adhesives thus obtained were applied immediately after the mixing of the two components and tested for open time, curing rate and mechanical properties after curing.

A measure employed for the open time was the tack-free time of the adhesive. This test was effected analogously to the determination of the skin formation time as described for example 1.

A measure employed for the curing rate was the curing time. To determine the curing time, the Shore A hardness (measured to DIN 53505) was measured on the cured adhesive at regular intervals and the adhesive was assessed as being completely cured as soon as the value for the Shore A hardness remained virtually constant.

To determine the mechanical properties after curing, the Shore A hardness, the tensile strength, the elongation at break and the modulus of elasticity were measured. The Shore A hardness was determined to DIN 53505 on specimens which had been cured under standard climatic conditions over 4 days. To test the further mechanical properties, the adhesive, immediately after the production, was pressed by means of a press to a film of thickness approx. 2 mm, and the film was cured under standard climatic conditions over 4 days and tested to DIN EN 53504 for tensile strength, elongation at break and modulus of elasticity (pulling speed: 200 mm/min).

All adhesives cure completely without bubbles.
The results of the tests are listed in table 10.

TABLE 10

Properties of the two-component elastic adhesives of examples 22 and 23 and of comparative example 24.

| | Example | | |
|---|---|---|---|
| | 22 | 23 | 24 (comparative) |
| Tack-free time (min) | 120 | 105 | 45 |
| Curing time (h) | 12 | 11 | 9 |
| Shore A hardness | 47 | 46 | 49 |
| Tensile strength (MPa) | 2.4 | 2.0 | 2.3 |
| Elongation at break (%) | 600 | 600 | 610 |
| Modulus of elasticity at 0.5-5% extension (MPa) | 2.4 | 2.1 | 2.3 |

It is clear from the examples that the inventive compositions, with a comparable curing rate, have a significantly longer open time than the compositions of the comparative examples. In the further properties determined in each case, such as the storage stability, the application properties, the mechanical properties after curing or the tack, in contrast, no significant differences are found between the inventive compositions and the compositions of the comparative examples.

The invention claimed is:

1. A composition comprising
a) a polyurethane polymer PUP that is based on at least one polyisocyanate P having aromatic isocyanate groups, at least one polyether diol, and/or at least one polyether triol, and
b) at least one dialdimine A of the formula (I),

wherein X is the radical of a diamine DA with two primary amino groups after the removal of these two amino groups; and
$Y^1$ and $Y^2$ are either
each independently a monovalent hydrocarbon radical having 1 to 12 carbon atoms,
or together are a divalent hydrocarbon radical which has 4 to 20 carbon atoms; and
$Y^3$ is a monovalent hydrocarbon radical or is a monovalent hydrocarbon radical having at least one heteroatom;
with the proviso that at least one of the two primary amino groups of the diamine DA is an aliphatic amino group, and the two primary amino groups of the diamine DA differ from one another
either
in the number of hydrogen atoms on the carbon atoms (Ca) in the a position to the particular amino group by at least one
or
in the number of hydrogen atoms on the carbon atoms (Cb) in the b position to the particular amino group by at least two.

2. The composition as claimed in claim 1, wherein the diamine DA is selected from the group consisting of 1,2-propanediamine, 2 methyl-1,2-propanediamine, 1,3-butanediamine, 1,3-diaminopentane (DAMP), 4-aminoethylaniline, 4-aminomethylaniline, 4-[(4-aminocyclohexyl)methyl]aniline, 2-aminoethylaniline, 2-aminomethylaniline, 2-[(4-aminocyclohexyl)methyl]aniline, 4-[(2-aminocyclohexyl)methyl]aniline; 2,2,4-trimethylhexamethylenediamine (TMD), 1,5-diamino-2-butyl-2-ethyl-pentane, 1-amino-3-aminomethyl-3,5,5-trimethylcyclohexane (=isophoronediamine=IPDA) and 1,4-diamino-2,2,6-trimethylcyclohexane (TMCDA).

3. The composition as claimed in claim 1, wherein the polyisocyanate used for the preparation of the polyurethane polymer PUP having aromatic isocyanate groups is an aromatic polyisocyanate which is selected from the group consisting of 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), oligomers and polymers of the aforementioned isocyanates, and any desired mixtures of the aforementioned isocyanates.

4. The composition as claimed in claim 1, wherein the diamine DA is selected from the group consisting of 1,3- diaminopentane (DAMP), 1,5-diamino-2-butyl-2-ethylpentane, 2,2,4-trimethylhexamethylenediamine (TMD) and 1-amino-3-aminomethyl-3,5,5-trimethylcyclohexane (=isophoronediamine=IPDA).

5. The composition as claimed in claim 1, wherein $Y^3$ is a radical of the formula (II) or (III),

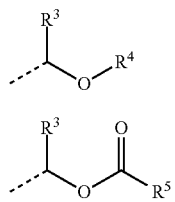

(II)

(III)

where $R^3$ is a hydrogen atom or an alkyl or arylalkyl group; $R^4$ is a hydrocarbon radical having 1 to 30 carbon atoms; and $R^5$
  is a hydrogen atom
  or
  is a linear or branched alkyl radical having 1 to 30 carbon atoms,
  or
  is a mono- or polyunsaturated, linear or branched hydrocarbon radical having 5 to 30 carbon atoms,
  or
  is a substituted aromatic or heteroaromatic 5- or 6-membered ring.

6. The composition as claimed in claim 1, wherein $Y^1$ and $Y^2$ are each methyl.

7. The composition as claimed in claim 1, wherein the polyurethane polymer PUP is present in an amount of 5 to 95% by weight based on the overall composition.

8. The composition as claimed in claim 1, wherein the dialdimine A of the formula (I) is present in the composition in such an amount that the ratio between the number of the aldimino groups and the number of the isocyanate groups in the composition is 0.1 to 1.1.

9. The composition as claimed in claim 1, wherein the composition comprises at least one catalyst that accelerates the hydrolysis of the aldimines.

10. The composition as claimed in claim 1, wherein the composition has one component.

11. The composition as claimed in claim 1, wherein the composition has two components and consists of a component K1 and a component K2.

12. The composition as claimed in claim 11, wherein the polyurethane polymer PUP having aromatic isocyanate groups and the dialdimine A of the formula (I) is part of component K1, and component K2 comprises compounds reactive toward isocyanate groups.

13. The composition as claimed in claim 11, wherein the polyurethane polymer PUP having aromatic isocyanate groups is part of component K1 and component K2 comprises the dialdimine A of the formula (I) and compounds reactive toward isocyanate groups.

14. A cured composition which is obtained by the reaction of a composition as claimed in claim 1 with water.

15. A cured composition which is obtained by the mixing of the two components K1 and K2 of a composition as claimed in claim 11, followed by a reaction with water.

16. A process for adhesive bonding of a substrate S1 to a substrate S2, comprising the steps of i) applying a composition as claimed in claim 1 to a substrate S1;
ii) contacting the composition applied with a substrate S2 within the open time of the composition;
or
i') applying a composition as claimed in claim 1 to a substrate S1 and to a substrate S2;
ii') contacting the compositions applied with one another within the open time of the composition;
said substrate S2 consisting of the same material as, or a different material than, the substrate S1.

17. A process for sealing, comprising the step of
i'') applying a composition as claimed in claim 1 between a substrate S1 and a substrate S2, such that the composition is in contact with the substrate S1 and the substrate S2;
said substrate S2 consisting of the same material as, or a different material than, the substrate S1.

18. A process for coating a substrate S1, comprising the step of
i''') applying a composition as claimed in claim 1 to a substrate S1 within the open time of the composition.

19. The process as claimed in claim 16, wherein the substrate S1 and/or the substrate S2 has been pretreated before the adhesive bonding or sealing or coating.

20. The process as claimed in claim 16, wherein the substrate S1 and/or the substrate S2 is an inorganic substrate or natural stone; an organic substrate, a plastic; a coated substrate; or a paint or a coating.

21. An article which has been adhesive bonded, sealed or coated by a process as claimed in claim 18.

22. The article as claimed in claim 21, wherein the article is a built structure or an industrial good or a consumer good or a mode of transport or an installable component of a mode of transport.

23. The composition as claimed in claim 1, wherein the at least one heteroatom of $Y^3$ is an oxygen atom.

24. The composition as claimed in claim 23, wherein the oxygen is in the form of ether, carbonyl or ester groups.

25. The composition as claimed in claim 1, wherein the at least one dialdimine A of formula (I) is obtained by a condensation reaction with elimination of water between at least one diamine DA of formula (IV):

(IV)

and at least one aldehyde ALD of formula (V):

(V)

wherein X, $Y^1$, $Y^2$ and $Y^3$ have the same definitions recited in claim 1, and wherein the diamine DA is selected from the group consisting of 1-amino-3-aminomethyl-3,5,5-trimethylcyclohexane, 1,3-diaminopentane, 1,5-diamino-2-butyl-2-ethyl-pentane, 2,2,4-trimethylhexamethylenediamine, and 4-aminomethylaniline, and the at least one polyisocyanate P having aromatic isocyanate groups is selected from the group consisting of 4,4'-methylenediphenyl diisocyanate and tolylene diisocyanate.

26. The composition as claimed in claim 25, wherein the at least one aldehyde ALD is 2,2-dimethyl-3-lauroyloxypropanal.

* * * * *